US005776511A

United States Patent [19]

Miki et al.

[11] Patent Number: 5,776,511

[45] Date of Patent: Jul. 7, 1998

[54] APPARATUS FOR FORMING PLATE-SHAPED ARTICLES

[75] Inventors: Teruhisa Miki; Tsuyoshi Sano, both of Kawanoe, Japan

[73] Assignee: Miki Tokushu Paper Mfg. Co., Ltd., Kawanoe, Japan

[21] Appl. No.: 643,414

[22] Filed: May 8, 1996

[30] Foreign Application Priority Data

Feb. 15, 1996 [JP] Japan .................................. 8-028265

[51] Int. Cl.$^{6}$ ................................................ B29C 43/48

[52] U.S. Cl. ...................... 425/115; 264/72; 264/172.19; 425/371; 425/406

[58] Field of Search .................................. 425/4 C, 83.1, 425/115, 371, 372, 406; 264/46.2, 46.3, 71, 280, 72, 171.13, 171.19, 319

[56] References Cited

U.S. PATENT DOCUMENTS

| | | | |
|---|---|---|---|
| 3,067,469 | 12/1962 | Yarrison | 425/115 |
| 3,779,686 | 12/1973 | Kerttula et al. | 425/371 |
| 4,047,865 | 9/1977 | Axer et al. | 425/371 |
| 4,298,418 | 11/1981 | Takagi | 425/371 |
| 4,432,714 | 2/1984 | Forry et al. | 425/115 |
| 5,284,546 | 2/1994 | Tilby | 425/371 |

*Primary Examiner*—Jay H. Woo

*Assistant Examiner*—Joseph Leyson

*Attorney, Agent, or Firm*—Wenderoth, Lind& Ponack

[57] ABSTRACT

An apparatus for continuously forming plate articles which can be installed in a low factory building, which can sufficiently press, heat and dry a mixture of materials, and which can manufacture surface-treated plate articles with high efficiency at a low cost. The mixture is introduced into an introducing chamber, and at the same time, decorative films are fed into the introducing chamber on both sides of the mixture. A semi-finished product made up of the mixture and decorative films are fed between a pair of horizontal hot plates to form it into a strip article. The strip article thus formed is cooled and cut into a plurality of plate articles provided with decorative layers on both sides.

5 Claims, 9 Drawing Sheets

APPARATUS FOR FORMING PLATE-SHAPED ARTICLES

BACKGROUND OF THE INVENTION

The present invention relates to an apparatus and a method of continuously forming a plurality of strips of plate-shaped articles from a pulverized raw material mixture.

We, the applicants of this invention, have proposed various methods and apparatus for forming plate-shaped articles from waste materials. For example, in Examined Japanese Patent Publication 7-57486, we proposed a method of forming resin reinforced fiberboards (plate-shaped articles). This method comprises the steps of shredding unrecyclable broke, or a fiber-containing material made up of sludge in waste water (about 20%) and waste paper (about 80%) in waste water into 2-3-square-centimeter pieces in a shredder, drying them in a drying furnace at 170°–300° C., and crushing them into cotton-like pieces in a crusher. 60–70% of the thus obtained cotton-like pieces are mixed with 30–40% of thermoplastic resins for binder such as industrial wastes (automotive paint scraps and synthetic fiber scraps). The mixture X obtained by agitating them is formed into a strip article Z by pressing while heating on a mixture forming machine, which is then cut to obtain a plurality of resin-reinforced fiberboards (plate-shaped articles).

The mixture forming machine used to form such plate-shaped articles is a rather tall apparatus as shown in FIG. 14. It comprises a mixture presser 10 having a trapezoidal section, a driving unit 11 for vertically moving the presser 10, a pair of vertical hot plates 12A, 12B defining a space having a flared top therebetween into which a material mixture X is introduced, a hot plate vibrating unit 13 for vibrating (pressing and releasing) the hot plates 12A, 12B to form the mixture X into the strip article Z, a pair of endless belts 14A, 14B covering the entire hot plates 12A, 12B for feeding the strip article Z, a rotary drive unit 16 comprising driving rolls 15A, 15B for driving the endless belts 14A, 14B so that their portions in contact with the mixture move in the mixture feed direction (downward), and a cooling unit 17 for cooling the surface of the strip article Z to 100° C. or less.

The drive unit 11 has a pair of suspension rods 18A, 18B having their bottom ends secured to the presser 10 and their top ends connected to the bottom ends of the crankshafts 19A, 19B whose top ends are connected to the edges of rotary disks 20A, 20B. By rotating the rotary disks 20A, 20B, the presser 10 can be moved up and down (for a stroke of about 50 mm).

The hot plate vibrating unit 13 provided on top of the hot plates 12A, 12B has a pair of driven rolls 21A, 21B having support shafts 22. Crankshafts 23A, 23B are connected at one end thereof to either end of the support shafts 22 and at the other ends to the edges of rotary disks 24A, 24B. By rotating the rotary disks 24A, 24B, the hot plates 12A, 12B are vibrated (for a stroke of about 5–15 mm).

The rotary drive unit 16 has a motor 25 coupled to the driving rolls 15A, 15B. By activating this motor 25, the endless belts 14A, 14B wound around the driving rolls 15A, 15B and the driven rolls 21A, 21B are moved so that the strip article Z is fed downward.

This apparatus is further provided with belt guide rolls 26A, 26B for preventing skids of the endless belts 14A, 14B, tightener rolls 27A, 27B for tightening the endless belts 14A, 14B, belt cleaners 28A, 28B for scraping off mixture X stuck on the endless belts 14A, 14B by rotating, thickness adjusters 29A, 29B (hydraulic cylinders) connected with the shafts of the driving rolls 15A, 15B for adjusting the thickness of the strip article Z, and a cutter 30.

This conventional mixture forming machine has a problem in that since the hot plates are arranged vertically, the entire apparatus tends to be tall. If large hot plates are used, a rather tall factory building is needed to install the apparatus.

The plate articles formed by this forming machine were unsatisfactory in color and lustre because they are formed from wastes. Therefore, they were exclusively used for products that are not seen by ordinary people, such as pallets and cushioning materials.

Ordinary plate articles include one comprising a base plate such as a particle board made of wood or a veneer having a decorative panel bonded to the surface of the base plate or provided with a decorative coating. If the base plate of such a plate article is made of a chemically stable material such as polyethylene or polypropylene, it is difficult to strongly bond a decorative panel to its surface or to provide a decorative coating thereon. Thus, in order to increase the added value of such a plate article, paint is usually fixed to such a base plate after roughening its surface.

To form these conventional plate articles, two separate manufacturing steps were needed, i.e. the step of manufacturing a substrate, and the step of providing a decorative layer on the substrate. The manufacturing cost was high due to plural steps. Especially if the substrate is made of polyethylene or polypropylene, the surface paint, which is simply adhered to the substrate, can easily peel off by external forces such as by scratching.

An object of the present invention is to provide a method for continuously manufacturing plate articles and an apparatus for carrying out this method which has horizontally positioned hot plates so that the apparatus can be installed in a low factory building even if its hot plates are large in size, and which can manufacture surface-treated plate articles with high efficiency and at low cost.

SUMMARY OF THE INVENTION

According to the present invention, there is provided an apparatus for continuously forming plate-shaped articles comprising a pair of belt support plates defining a material introducing chamber having an upwardly increasing width so that a mixture of materials can be easily introduced into the chamber, a pair of inlet rolls provided at the top ends of the belt support plates, a pair of thin endless belts, a pair of horizontal hot plates provided vertically spaced from each other for pressing the mixture to form the mixture into a strip article, a hot plate moving unit for vertically symmetrically moving the hot plates, delivery rolls for moving the endless belts in a direction in which the strip article is fed, and a cooling unit for cooling the surface of the strip article, the belts being wound around rolls so as to cover the belt support plates, hot plates and cooling plates. This apparatus can be installed in a low factory building even if its horizontal hot plates are large in size.

Other features and objects of the present invention will become apparent from the following description made with reference to the accompanying drawings, in which:

DETAILED DESCRIPTION OF THE PREFERRED EMBODIMENT (First Embodiment)

Figure 1:
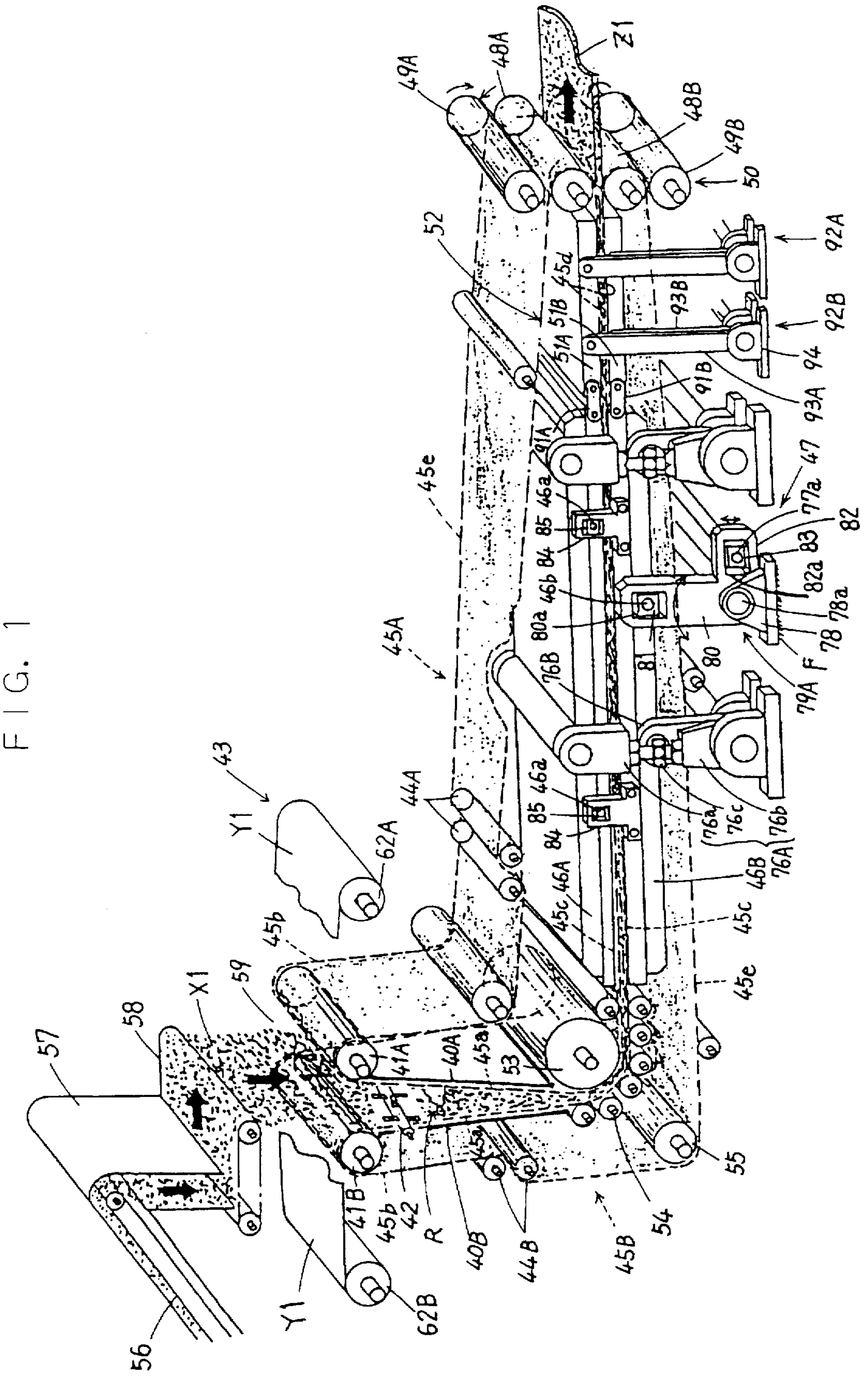
FIG. 1 is a perspective view of an entire apparatus for continuously forming plate articles of a first embodiment according to the present invention (belts are shown by chain lines to distinguish them from other parts)
Figure 2:
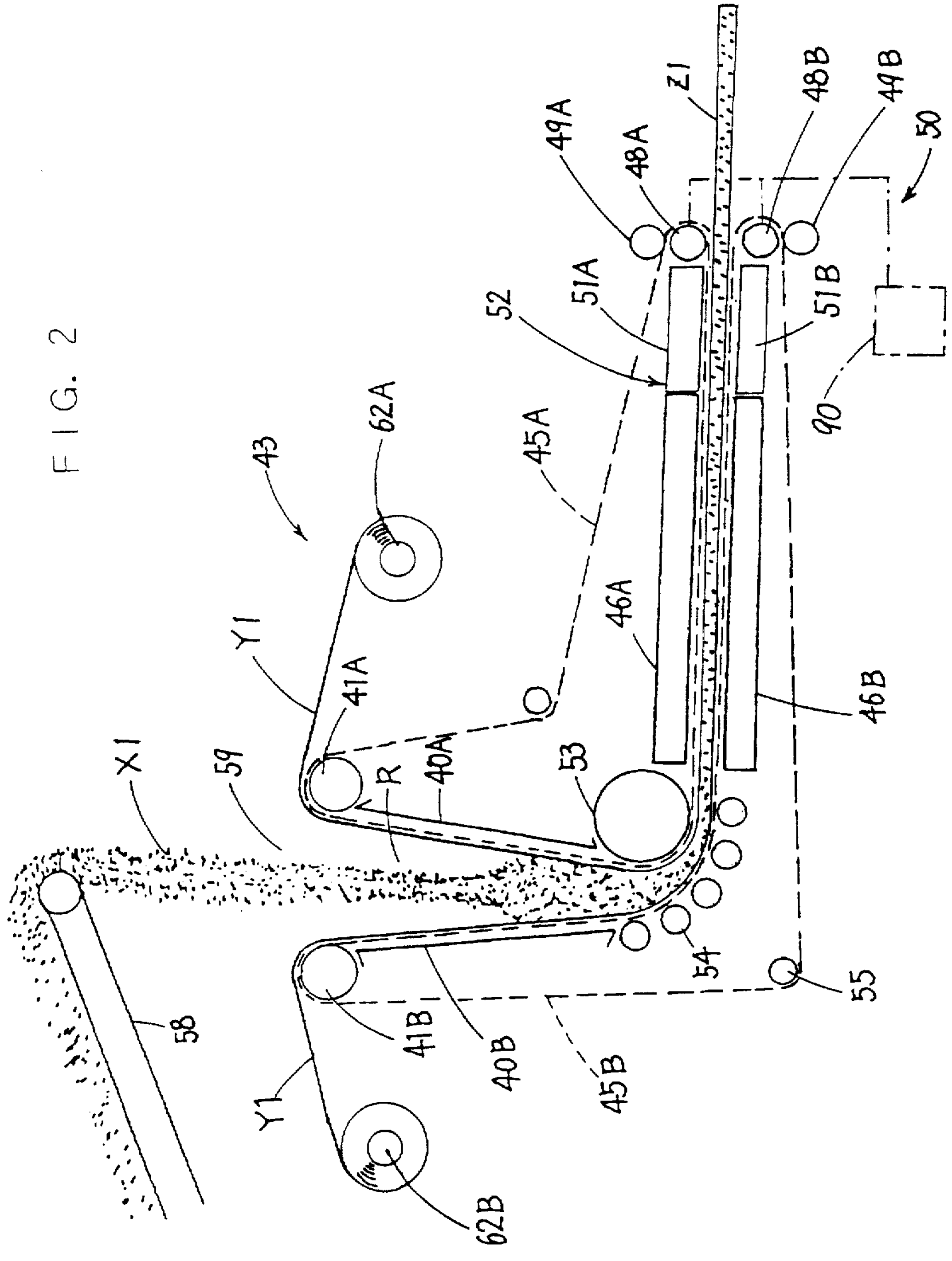
FIG. 2 is a partial view of the embodiment shown in FIG. 1.

FIGS. 1–8 show the first embodiment of the apparatus and method for continuously forming a plurality of plate articles. Description is first made of the apparatus, which is a machine for forming a mixture of materials into predetermined shapes. As shown in FIGS. 1 and 2, the machine has a pair of belt support plates 40A and 40B defining a material introducing chamber R having an upwardly increasing width so that a mixture X1 of materials can be easily introduced into the chamber R (this chamber is hereinafter referred to as a pre-pressing chamber R because the mixture X1 is pre-pressed in this chamber). A pair of inlet rolls 41A and 41B are provided at the top ends of the plates 40A and 40B.

A mixture fibrillating vane 42 is provided between the rolls 41A and 41B. Decorative films Y1 are supplied from decorative film supply units 43 to cover both sides of the mixture X1. A pair of thin endless belts 45A and 45B run a circulating path comprising a pre-pressing section 45*a*, a waiting section 45*b*, a mixture hot-pressing section 45*c*, a cooling section 45*d* and a return section 45*e*. They are prevented from meandering by belt meander preventive rollers 44A and 44B.

An upper and a lower horizontal hot plate 46A and 46B are provided in the hot pressing section 45*c*. By vertically vibrating (pressing and releasing) the hot plates 46*a* and 46*b* synchronously with each other with a hot plate moving unit 47 (the hot plate motion cycle varies from 0.5 to 3 sec according to the forming speed), the raw material mixture X1 and the decorative films Y1 are formed into a strip article Z1.

A drive unit 50 comprising delivery rolls 48A and 48B and press rolls 49A and 49B discharges the strip article Z1 by moving the endless belts in the feed direction. A cooling unit 52 comprising a pair of cooling plates 51A and 51B is provided to cool the surface of the strip article Z1 to 100° C. or less. The endless belts 45A, 45B are wound around rolls so as to cover the entire belt support plates 40A, 40B, hot plates 46A, 46B and cooling plates 51A, 51B. The forming machine of this embodiment further includes a large heat roll 53 (also serving as a belt guide roll), six small heat rolls (also serving as belt guide rolls), and a belt support roll 55. In FIG. 2, some of the elements shown in FIG. 1 are omitted.

The raw material mixture X1 is prepared in the following manner. Unrecyclable broke, or a fiber-containing material made up of sludge (about 20%) and waste paper (about 80%) in waste water are shredded into 2–3-square-centimeter pieces in a shredder, dried in a drying furnace at 170°–300° C., and crushed into cotton-like pieces in a crusher. 60–70% of the thus obtained cotton-like pieces are mixed with 30–40% of thermoplastic resins such as industrial wastes (automotive paint scraps and synthetic fiber scraps).

The mixture X1 is obtained by agitating them together in a mixer. The mixture X1 thus obtained is fed into a supply hopper 57 by a feed conveyor 56. From the hopper 57, it is fed by a constant-feed conveyor 58 and dropped into the inlet 59 of the mixture forming machine. Since unrecyclable broke and sludge in waste water usually contain 70–80% fibers, articles formed from these materials are higher in their strength than articles formed from materials containing no fibers such as sawdust.

If such raw material is shredded so that its fiber length is shorter than 2–3 cm, the strength of the material will not be sufficient. Thermoplastic resins as a binder are added by 30–40% so that this material will degrade and return to earth in about ten years. If they are added by 50–70%, the durability (weather resistance) of the material will increase to such an extent that it will not return to earth semipermanently.

Instead of unrecyclable broke, sludge in waste water or waste paper, such wastes as resin fiber scraps and wood chips including driftwood and thinnings may be used. If wood chips are used as the raw material, they are crushed to 2–3-square-centimeter pieces in a crusher, and then pulverized to powder (0.5–2 mm) in a pulverizer. 60–70% of the thus pulverized material is mixed with 30–40% of thermoplastic resins as a binder such as industrial wastes (automotive paint scraps and synthetic fiber scraps). The mixture X1 is obtained by agitating them together in a mixer.

Since the mixture X1 is formed mostly from wastes, its material cost is near zero. Better still, wastes can be recycled.

Decorative films Y1 may be waste paper discarded as defectives, plastic sheets, laminated sheets, polypropylene, polyethylene, flame-resistant cloth. Their thickness should be 0.2–1 mm. They should be patterned and colored such that they present a beautiful outer appearance.

Figure 3:
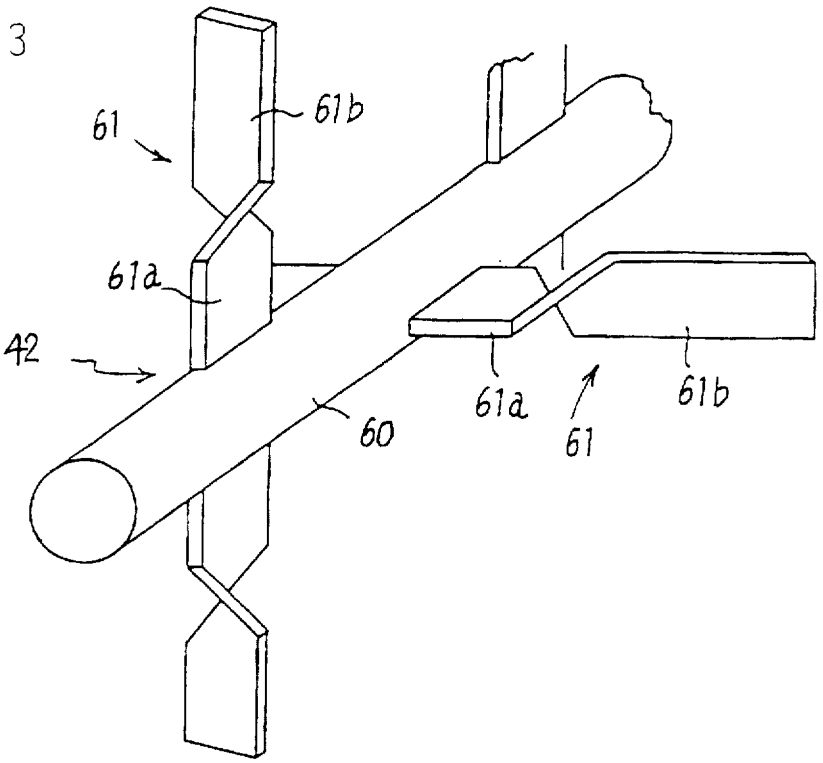
FIG. 3 is a partial perspective view of a mixture untangling vane of the first enbodiment.

The mixture fibrillating vane 42 untangles lumps in the mixture X1, thereby preventing the strip article Z1 from developing stripe banding which can lead to reduced strength of the article Z1 at the boundaries. As shown in FIG. 3, it comprises a vane shaft 60 driven by an unillustrated motor, and a plurality of vane blades 61. The vane blades 61 are axially fixed to the vane shaft 60 (by e.g. soldering) and twisted 90° at their mid-points. With this arrangement, the axially-extending portion 61*a* of each vane blade produces a wind, dispersing the fine mixture X1, while the perpendicularly twisted portion 61*b* untangles the lumps in the mixture X1. The vane 42 is rotated at 800–1600 rpm. The length of the vane blades 61 is adjusted such that they may not touch the surfaces of the endless belts 45A and 45B.

As seen in FIG. 2, the decorative film supply units 43 are a pair of supply rolls 62A, 62B rotatably supported on unillustrated side plates. Each supply roll 62A, 62B carries a roll of decorative film Y1. The end of each decorative film Y1 is placed beforehand on the endless belts 45A, 45B wound around the inlet rolls 41A, 41B in the pre-pressing chamber R. When the mixture X1 is dropped into the pre-pressing chamber R in this state, the ends of the decorative films Y1 are pressed against the endless belts 45A, 45B. Thus, by moving the endless belts 45A, 45B, the decorative films Y1 are moved by the belts 45A, 45B together with the mixture XI toward the hot plates 46A, 46B. The decorative films Y1 are thus continuously unrolled from the supply rolls 62A, 62B into the pre-pressing chamber R. Namely, when the mixture X1 is dropped into the pre-pressing chamber R, the decorative films Y1 are always on both sides of the mixture X1.

Figure 4:
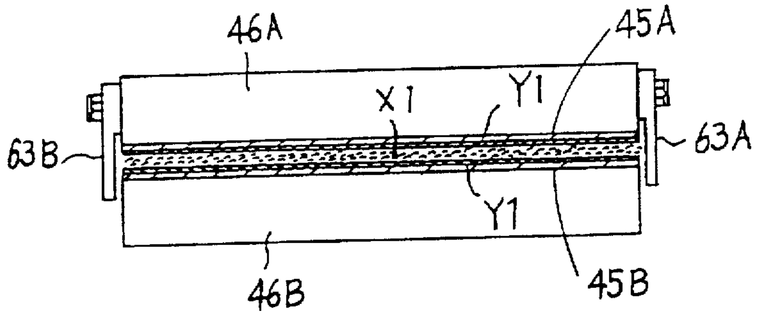
FIG. 4 is a schematic side view of the hot plates of the first embodiment.
Figure 6:
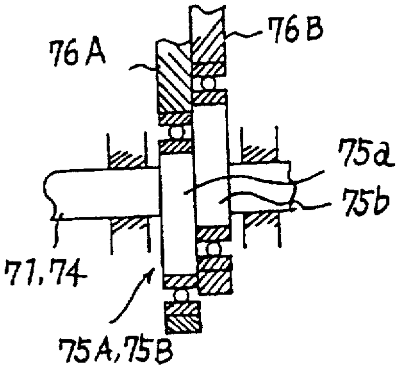
FIG. 6 is a vertical sectional view of a crank mechanism of the first embodiment.

Pipes (not shown) extend meandering through the hot plates 46A, 46B. Oil as a heating medium heated to about 300° C. by a boiler is passed through the pipes to heat the hot plates to 120–250° C. Similar pipes are provided in the large heat roll 53 and small heat rolls 54 so that they can be heated to 120–250° C. too. Referring to FIG. 4, baffle plates 63A, 63B are detachably mounted on both sides of the upper hot plate 46A to prevent the mixture X1 from being squeezed out, pressed by the hot plates 46A, 46B. The effective width of the strip article Z1 is thus kept constant (the yield thus improves). Without the baffle plates, the mixture X1 would be squeezed out uncontrollably, so that the density of the strip article Z1 would drop by 10–20% along both edges.

Figure 5:
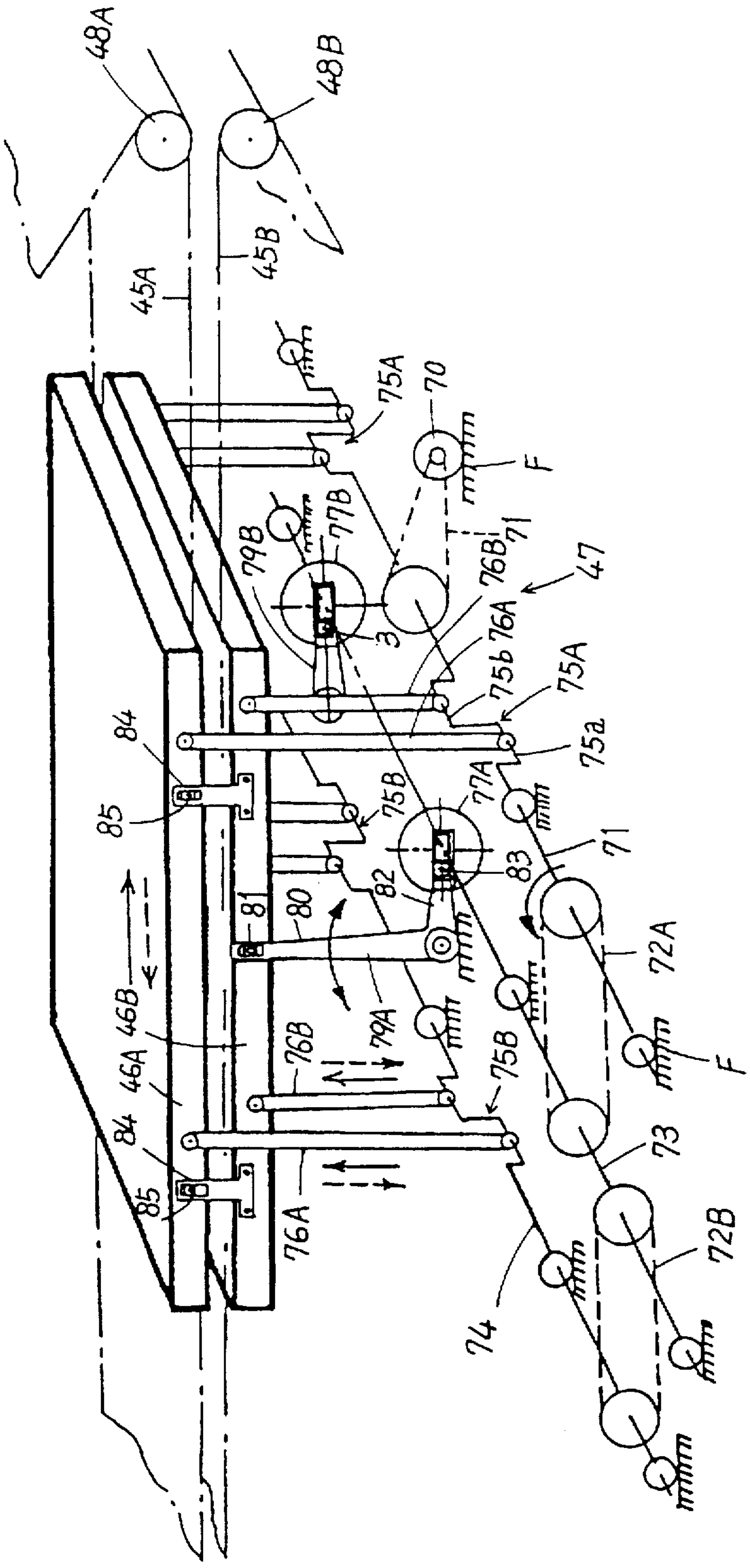
FIG. 5 is a schematic perspective view of a hot plate moving unit of the first embodiment.

The hot plate moving unit 47 moves the hot plates 46A, 46B up and down and right and left. As shown in FIG. 5, it comprises a drive shaft 71 coupled, via a belt 71A, to a motor 70 fixedly mounted on a machine frame F, and a first and a second driven shaft 73, 74 that are coupled to the drive shaft 71 by means of sprocket chains 72A, 72B. The drive shaft 71 and the first and second driven shafts 73, 74 are also mounted on the machine frame F.

As shown in FIGS. 1 and 5, the hot plate moving unit 47 has an elevator means comprising a pair of crank mechanisms 75A, 75B (see FIG. 6) in the form of eccentric cams **75*a*, 75*b* mounted on the drive shaft 71 and the second driven shaft 74, respectively. This elevator means is coupled to both sides of the hot plates 46A, 46B by means of (a total of eight) links 76A, 76B so that the lower hot plate 46B will be at the bottom dead center when the upper hot plate 46A** is at the top dead center.

The hot plate moving unit 47 also has a means for moving the hot plates right and left. As shown in FIGS. 1 and 5, it comprises a pair of rotary plates 77A, 77B having a pair of pins **77*a* and fixed to the central first driven shaft 73, and L-shaped links 79A, 79B rotatably supported on pins 78*a* of a pair of brackets 78 fixed to the machine frame F. A slider 81 is vertically slidably received in a groove 80*a* formed in the top end of the longitudinal arm 80 of each L-shaped link 79A, 79B. Each slider 81 is rotatably coupled to a pin 46*b* provided on either side of the lower hot plate 46B. A slider 83 is horizontally slidably received in a horizontal groove 82*a* formed in the horizontal arm 82 of each L-shaped link 79A, 79B. Each slider 83 is rotatably coupled to a pin 77*a* of each rotary plate 77A, 77B**.

Figure 7:
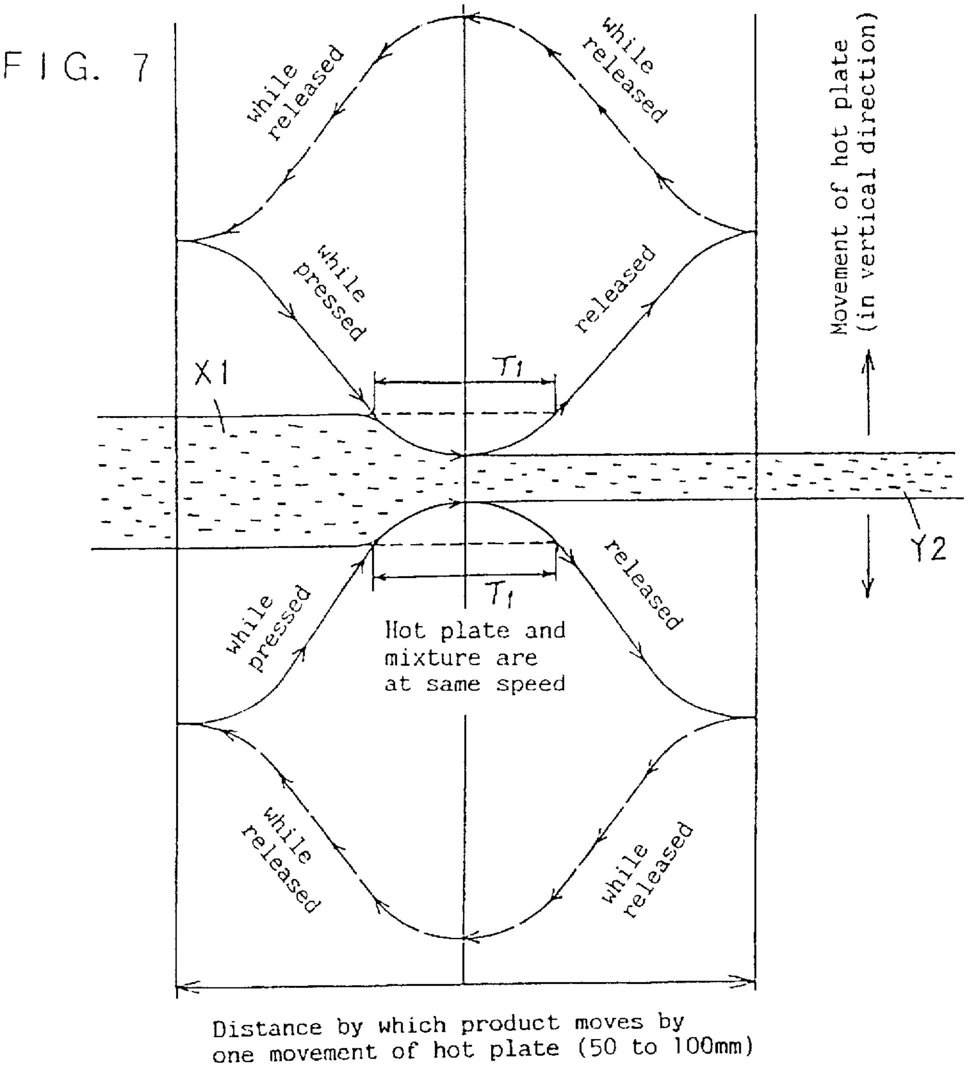
FIG. 7 is a schematic view showing the movement of the hot plates.
Figure 8:
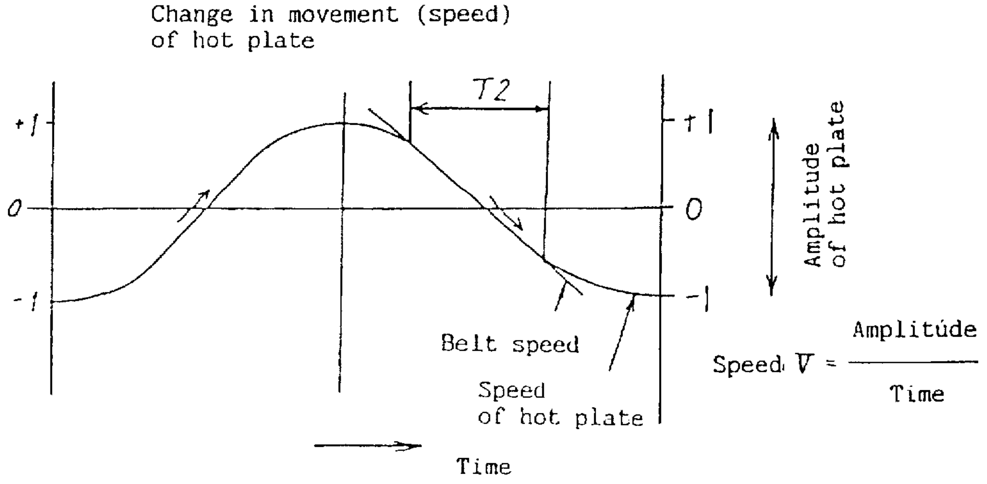
FIG. 8 is a graph showing how the moving speed of the hot plates changes.

By rotating the rotary plates 77A and 77B, the L-shaped links 79A, 79B pivot about the pins **78*a* of the brackets 78, so that their horizontal arms 82 swing up and down, while their longitudinal arms 80 swing right and left. Due to the movement of the L-shaped links and the function of the above elevator means, the hot plate 46B moves, as shown in FIG. 7, along a curve similar to a sine curve (amplitude about 5–15 mm) which is a combination of vertical and horizontal motions. Inverted T-shaped coupling plates 84 are fixed to both sides of the lower hot plate 46B. They vertically slidably support sliders 85 rotatably coupled to pins 46*a* provided on both sides of the upper hot plate 46A. The upper hot plate 46A and the lower hot plate 46B** move horizontally in the same direction and vertically in the opposite directions to each other.

Also, the hot plate moving unit 47 can freely adjust the thickness of the strip article Z1 by varying the space between the upper hot plate 46A and the lower hot plate 46B. Namely, as shown in FIG. 1, the unit 47 has (a total of four) links 76A coupled to the upper hot plate 46A and each comprising a upper and a lower plate **76*a* and 76*b* and an intermediate adjusting screw 76*c*. By turning the adjusting screws 76*c* of the links 76A, the upper hot plate 46A** can be finely moved up and down.

The upper plate 46A and the lower hot plate 46B are initially inclined relative to each other so that if the distance therebetween at the outlet end (righthand end in FIG. 1) is zero millimeter, the distance therebetween at the inlet end is about 30 mm. According to the thickness of the strip article Z1 to be formed, the above values are changed. For example, in order to form a 12-mm-thick strip article, the outlet end is widened to 12 mm, while the inlet end is widened to about 30 mm+12/2=36 mm, though the latter value varies depending upon various factors such as the composition of the mixture X1, temperature of the hot plates 46A, 46B and production speed.

The drive unit 50 has its delivery roll pair 48A, 48B coupled to a motor 90 (see FIG. 2), and its press rolls 49A, 49B pressed against the delivery rolls 48A, 48B with the endless belts 45A, 45B sandwiched between the press rolls are thus rotated by the delivery rolls. The delivery rolls 48A, 48B also serve to restrict the thickness of the strip article Z1.

The cooling unit 52 comprises the upper and lower cooling plates SA, 51B, (a total of four) small links 91A, 91B coupling the respective cooling plates to the upper and lower hot plates 46A, 46B, and crank mechanisms 92A, 92B for moving cooling plates 51A, 51B up and down and right and left in synchronism with the hot plates 46A, 46B. The crank mechanisms are structurally similar to the crank mechanisms 75A, 75B, each comprising links 93A, 93B, a bracket 94 and an eccentric cam. Transverse holes (not shown) are formed in the cooling plates 51A, 51B. The cooling plates are cooled by passing cooling water as a coolant through the holes. The cooling plates 51A, 51B move up and down and right and left along the strip article Z1 synchronously with the hot plates 46A, 46B. The strip article Z1 is fed about 100 mm in one cycle.

Now we will describe the method of continuously forming plate articles. The agitated mixture X1 is fed into the hopper 57 by the conveyor 56, transported on the constant-feed conveyor 58 and dropped into the inlet 59 of the mixture forming machine. Since the mixture X1 is subjected to pretreatment (with the shredder, pulverizer and mixer), it is untangled more or less. But without the mixture untangling vane 42, if the mixture X1 is stored in the hopper 57 and fed by the constant-feed conveyor 58 into the pre-pressing chamber R (and pressed from an initial thickness of about 240 mm to a thickness of about 30 mm by the time it is fed by the endless belts 45A, 45B to the bottom end), it will partially harden into lumps (like silkworm cocoons) again by coming into contact with various parts of the machine, developing stripe banding, which will reduce its strength at the boundaries. The plate articles thus obtained will be insufficient in strength. For this reason, it is necessary to cut and break the lumps in the falling mixture X1 with the rotating mixture untangling vane 42 before feeding it into the pre-pressing chamber R.

Since the ends of the decorative films Y1 are disposed on the endless belts 45A, 45B in the pre-pressing chamber R, by dropping the mixture X1 into the pre-pressing chamber R, the decorative films Y1, positioned outside the mixture X1, are pressed against the endless belts 45A, 45B by the mixture Xi. By moving the endless belts 45A, 45B in the direction of arrow in FIG. 2 in this state, the semi-finished product consisting of the mixture X1 and the decorative films Y1 (enclosing the mixture X1) is pre-pressed while being fed toward the hot plates 46A, 46B by the endless belts 45A, 45B. By moving the endless belts, the decorative films Y1 are unrolled from the supply rolls 62A, 62B, pulled by the mixture X being dropped continuously into the pre-pressing chamber R.

The semi-finished product is then heated by passing between the large heat roll 53 and the small heat rolls 54, which have been heated by passing a heating medium, and then fed into between the hot plates 46A and 46B, which have been heated to a high temperature by passing a heating medium. In this state, the hot plates 46A, 46B are being moved up and down and right and left by the hot plate vibrating moving unit 47, so that the mixture is repeatedly pressed and released as shown in FIG. 7 (preferably, the amplitude is 5–15 mm and the cycle duration 0.5–3 sec). Namely, the hot plates 46A, 46B presses the semi-finished product while moving in the same direction as the product is being fed, and separate upward and downward from the endless belts 45A, 45B and the semi-finished product while moving in the opposite direction to return to the original position. This cycle is repeated.

The endless belts 45A, 45B (e.g. 1300 mm wide) are continuously moving. Near the point where the pressure on the semi-finished product is the highest (time T1 in FIG. 7 and time T2 in FIG. 8), the endless belts 45A, 45B are pressed against the hot plates 46A, 46B, so that the relative movement therebetween becomes zero. In this state, heat is conducted from the hot plates 46A, 46B to the semi-finished product through the endless belts 45B, 45B. In this state, too, the endless belts 45A, 45B keep moving together with the moving hot plates 46A, 46S. But immediately before and after the point at which the pressure on the semi-finished product becomes maximum, the hot plates 46A, 46B will slip and move relative to the endless belts 45A, 45B. Since the semi-finished product is not in direct contact with the hot plates, no tensile force is applied from the hot plates to the semi-finished product. Thus, its density can be kept so uniform and its surface so smooth that it is possible to form a sufficiently thin product having a thickness of mere 2 to 6 mm. Since the hot plates 46A, 46B are vibrated (at 120°–250° C.) and due to the fact that the heat can be transferred at high efficiency to the semi-finished product in a compressed state, the water and gas contents in the mixture X1 can be removed gradually, so that the mixture X1 is eventually degassed and dehydrated completely. Its density thus increases sufficiently. If gas should remain in the mixture X1, it may develop holes in the surface when the gas is released.

By passing through the hot plates 46A, 46B, the semi-finished product is formed into the strip article Z1. In this state, the decorative films Y1 are strongly fused or bonded to both sides of the mixture X1 so that they will not semipermanently peel off. By moving the endless belts 45A, 45B, the strip article Z1 is fed into between the cooling plates 51A, 51B, which has been cooled by passing a coolant, to cool the surface of the strip article Z1. After cooling, the strip article Z1 is cut to a plurality of plate-shaped articles of a predetermined length. The decorative films covering these plates improve their outer appearance in color, luster and gloss. By reheating these plate articles, they can be formed into any desired three-dimensional shape. For example, it is possible to form secondary products having complicated shapes such as pallets from such plate articles on or off the line.

Since the hot plates 46A, 46B are placed horizontally one over the other., the entire apparatus is sufficiently short no matter how large the plates 46A, 46B are. Such an apparatus can be installed in a low-ceilinged factory building. The semi-finished product consisting of the mixture X1 and the decorative films Y1 can be continuously pressed, heated and dried with high efficiency.

The mixture untangling vane 42 untangles the mixture X1 immediately before being dropped into the pre-pressing chamber R. This prevents the strip article Z1 from developing stripe banding. Strong plate articles can be formed from such a strip article Z1.

The mixture X1 is a mixture of waste materials. Its material cost is thus nearly zero. Wastes are more efficiently recyclable.

The decorative films Y1 covering the strip article Z1 make it unnecessary to subject the article to further surface treatment to improve its outer appearance. Thus, the plate articles can be formed efficiently at a low cost. Because of their beautiful outer appearance, it is possible to use such plate articles even as interior decoration walls besides their originally intended use as e.g. pallets and cushioning materials.

(Second Embodiment)

Figure 9:
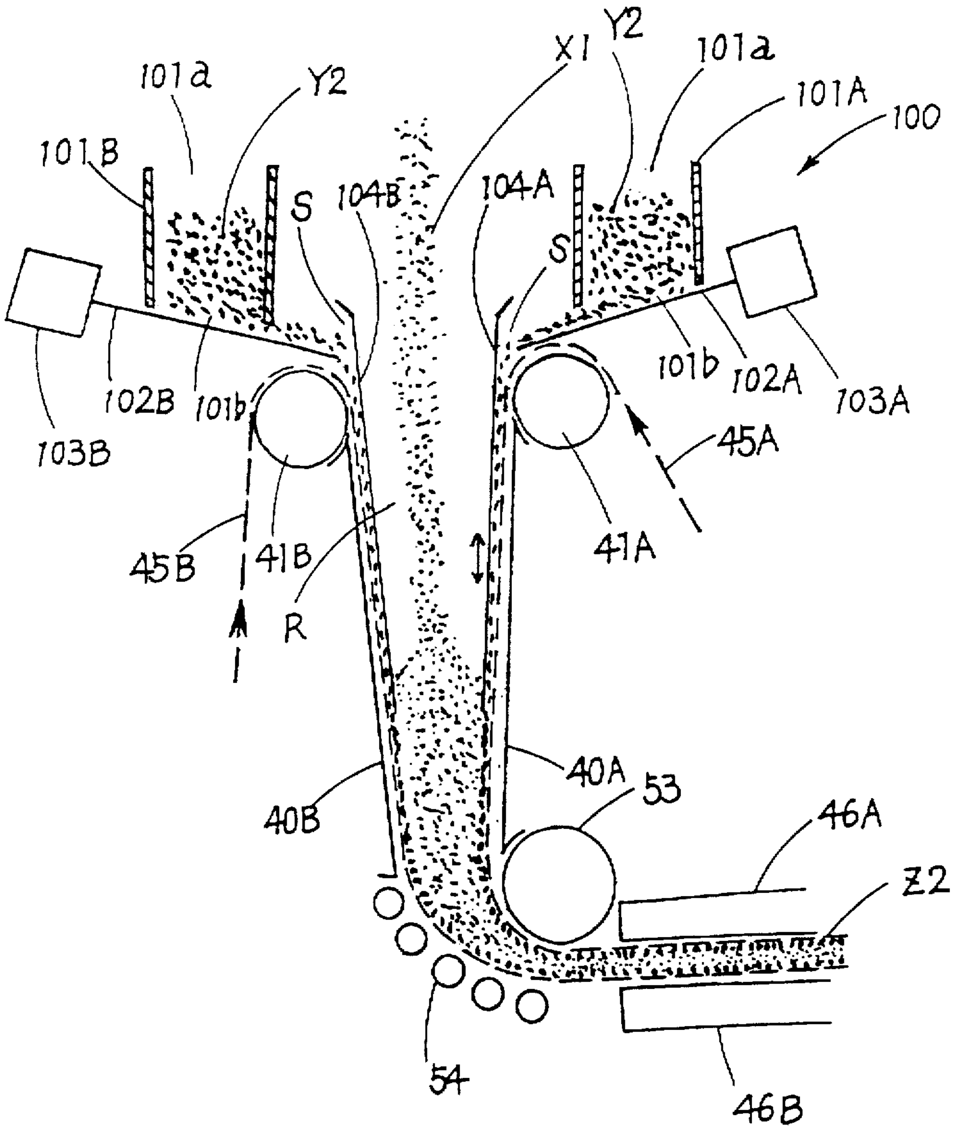
FIG. 9 is a partial view of an apparatus for continuously forming plate articles of a second embodiment.

As shown in FIG. 9, the mixture forming machine of the second embodiment has no decorative film supply unit. Instead, it has a powder supply unit 100 for supplying powder such as refractory powder Y2 provided on both sides of the pre-pressing chamber R into which the mixture X1 is supplied.

The powder supply unit 100 comprises a pair of hopper 101A, 101B that store refractory powder Y2 (powder of refractory cement or refractory bricks), a pair of feeders 102A, 102B provided under the hoppers 101A, 101B for receiving the refractory powder Y2 dropped from the hoppers 101A, 101B, a pair of vibrators 103A, 103B for vibrating the feeders 102A, 102B, and a pair of refractory powder guide plates 104A, 104B provided in the pre-pressing chamber R substantially in parallel to the endless belts 45A, 45B for guiding the refractory powder Y2 sliding down from the feeders 102A, 102B to both sides of the mixture X1 in the pre-pressing chamber R.

The hoppers 101A, 101B are provided above and on both side of the pre-pressing chamber R, and have top inlets 101*a* and bottom outlets 101*b*. The refractory powder Y2 in the hoppers 101A, 101B is dropped through their outlets by gravity.

The feeders 102A, 102B slope downward toward the space S between the endless belts 45A, 45B and the refractory powder guide plates 104A, 104B. Their angle of inclination is determined such that the refractory powder Y2 can slide down the feeders only while the feeders are being vibrated.

The vibrators 103A, 103B are fixed to the ends (remote from the space S) of the feeders 102A, 102B. By varying the intensity of vibration of the feeders 102A, 102B, it is possible to adjust the amount of refractory powder Y2 sliding down from the feeders 102A, 102B into the space S, i.e. the feed rate of refractory powder Y2 into the pre-pressing chamber R.

Figure 10:
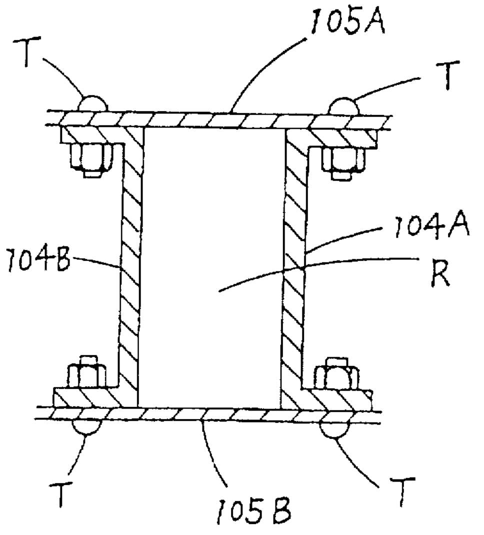
FIG. 10 is cross-sectional view of refractory powder guide plates of the second embodiment showing how they are fixed to the side plates.
Figure 11:
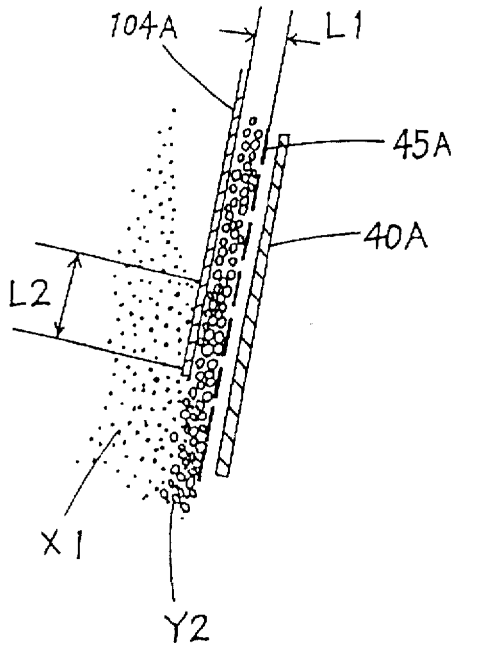
FIG. 11 is an enlarged vertical sectional view of the portion where the mixture of materials is mixed with refractory powder.

As seen in FIG. 10, the refractory powder guide plates 104A, 104B are provided between and fixed by bolts T to a pair of side plates 105A, 105B, while being spaced from the endless belts 45A, 45B by 3–5 mm (distance L1 in FIG. 11).

The refractory powder guide plates 104A, 104B are, as shown in FIG. 11, formed with a plurality of bolt holes (not shown) in a vertical row so that their vertical mounting position to the side plates is adjustable. The refractory powder guide plates 104A, 104B are preferably fixed in such a position that their top ends are located above the feeders 102A, 102B and their portions near the bottom ends overlap the mixture X1 by a vertical distance L2 (FIG. 11) of about 50 mm. By positioning their tops ends above the feeders 102A, 102B, it is possible to prevent the refractory powder Y2 from sliding down from the feeders 102A, 102B directly into the pre-pressing chamber R. By positioning their bottom ends so as to overlap the mixture X1 by a distance of about 50 mm, it is possible to mix the mixture X1 with the refractory powder Y2 when the former has deposited to a given height. With this arrangement, the refractory powder Y2 will not infiltrate into the mixture X1 but kept outside the mixture. Otherwise, this embodiment is the same as the first embodiment. The same numerals are attached to the elements similar in function to the elements of the first embodiment.

Plate articles are manufactured in the following manner. Simultaneously when the mixture X1 is fed into the pre-pressing chamber R, the vibrators 103A, 103B are activated to vibrate the feeders 102A, 102B so as to slide down the refractory powder Y2 on the feeders 102A, 102B into the space S between the endless belts 45A, 45B and the refractory powder guide plates 104A, 104B. As the refractory powder Y2 on the feeders 102A, 102B slides down into the space S, the refractory powder Y2 in the hoppers 101A, 101B drops by gravity onto the feeders 102A, 102B.

The refractory powder Y2 dropped into the space S is then guided downward along the refractory powder guide plates 104A, 104B by gravity and by moving the endless belts 45A, 45B so as to be mixed with the mixture X1 deposited in the pre-pressing chamber R. The refractory powder Y2 never penetrates into the mixture X1 but it kept outside mixture X1. By moving the endless belts 45A, 45B, the semi-finished product consisting of the mixture X1 and the refractory powder Y2 (enclosing the mixture X1) is fed, while being pre-pressed, toward the hot plates 46A, 46B.

Figure 12:
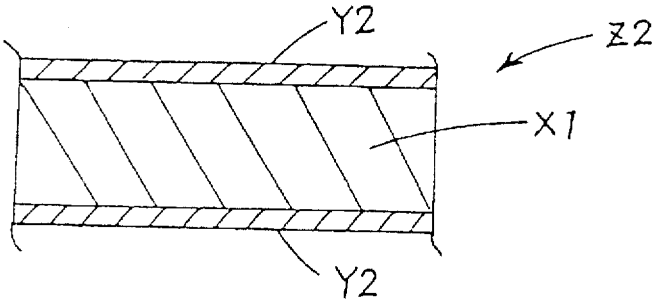
FIG. 12 is a vertical sectional view of strip article comprising the mixture of materials and refractory powder layers provided on both sides of the mixture substrate.

Thereafter, in the same manner as in the first embodiment, the semi-finished product is fed between the hot plates 46A and 46B and formed into a strip article Z2. Once formed into the strip article Z2 as shown in FIG. 12, the refractory powder Y2 is bonded so strongly to both sides of the mixture X2 that they will not peel off semipermanently. The strip article Z2 thus formed is 3–12 mm thick, each refractory powder layer being 0.5–1 mm thick. The strip article Z2 is cooled and then cut with a cutter to form refractory plate articles having refractory layers on both sides. Their fire resistance is adjustable by varying the feed rate of the refractory powder by adjusting the intensity of vibration produced by the vibrators 103A, 103B.

The refractory powder layers covering the strip article Z2 make no additional surface treatment necessary. Thus, the refractory plate articles can be formed efficiently at a low cost. Because of their high fire resistance, it is possible to use such plate articles even as fire-resistant walls besides their originally intended use as e.g. pallets and cushioning materials.

(Third Embodiment)

Figure 13:
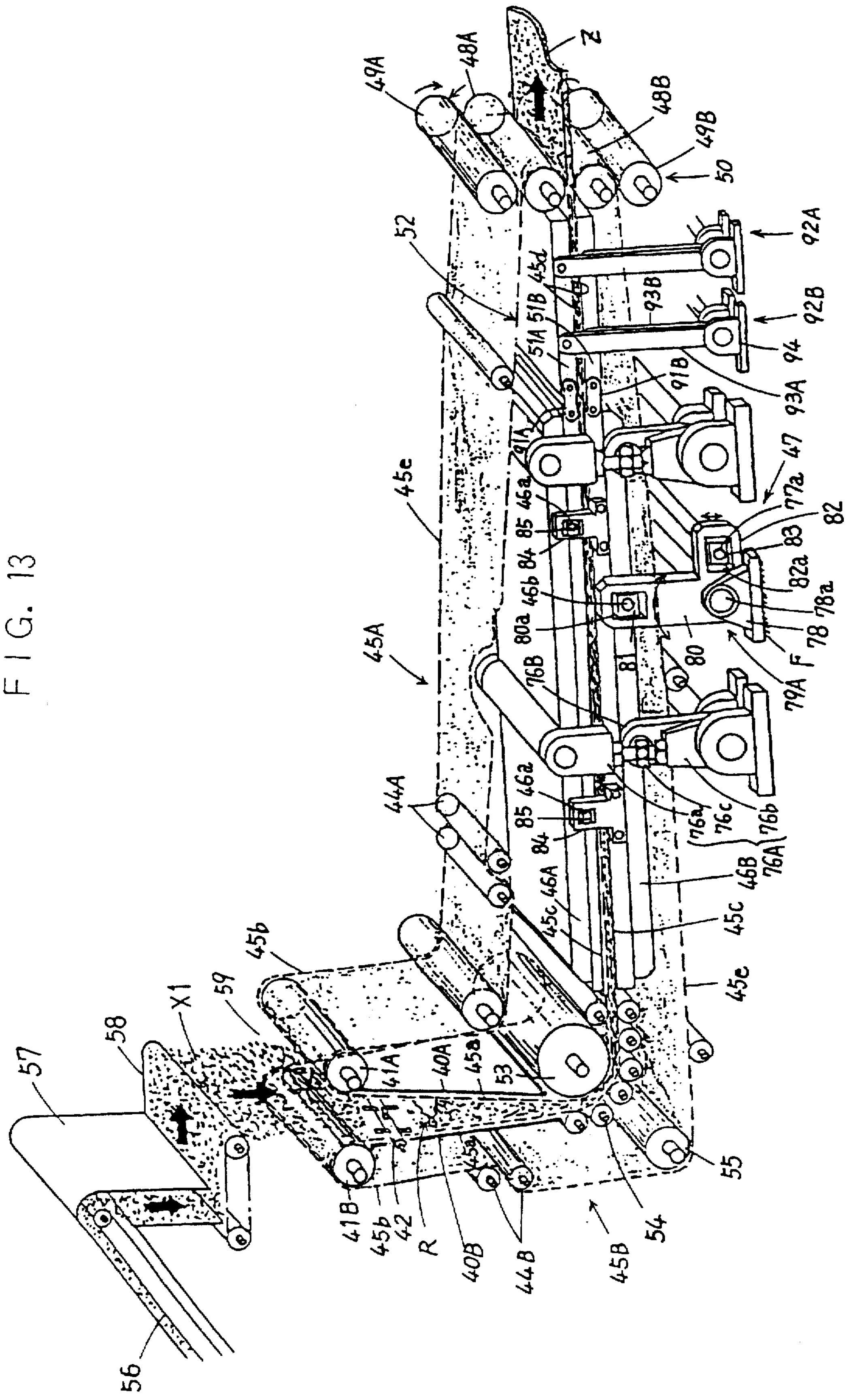
FIG. 13 is a perspective view of an entire apparatus for continuously forming plate articles of a third embodiment according to the present invention (belts are shown by chain lines to distinguish them from other parts)
Figure 14:
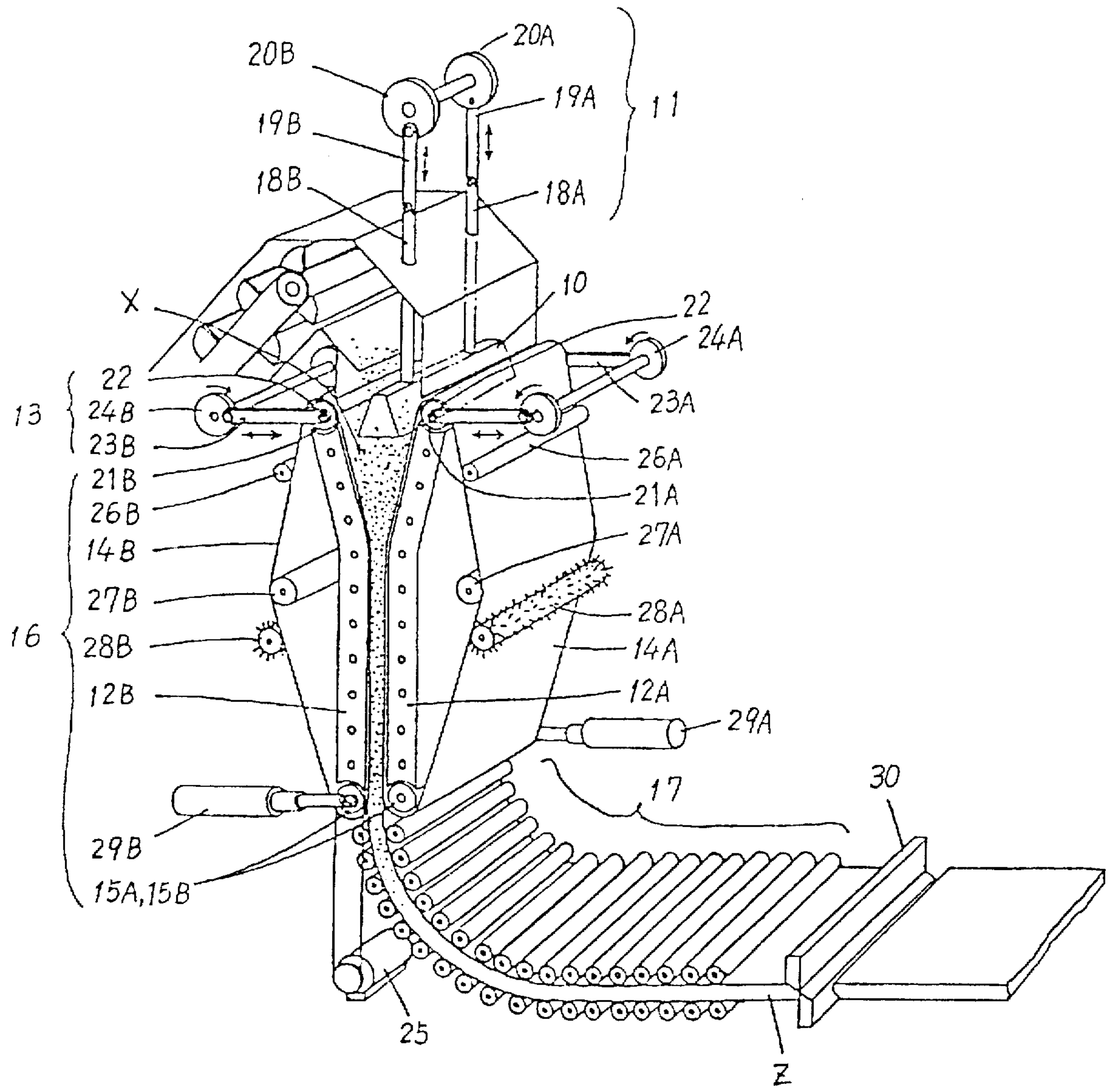
F I G. 14 PRIOR ART
FIG. 14 is a perspective view of a conventional apparatus for continuously forming plate articles.

As shown in FIG. 13, the mixture forming machine of the third embodiment has no decorative film supply unit. Otherwise, this embodiment is the same as the first embodiment. The same numerals are attached to the elements similar in function to the elements of the first embodiment.

The agitated mixture X1 is fed into the hopper 57 by the conveyor 56, transported on the constant-feed conveyor 58 and dropped into the inlet 59 of the mixture forming machine. The mixture X1 is fed into the pre-pressing chamber R after untangling lumps in the mixture with the rotating mixture untangling vane 42.

Then, the mixture X1 is fed, while being pre-pressed, toward the hot plates 46A, 46B by the endless belts 45A, 45B. The mixture X1 is then heated by passing between the large heat roll 53 and the small heat rolls 54, which have been heated by passing a heating medium, and then fed into between the hot plates 46A and 46B, which have been heated to a high temperature by passing a heating medium. Due to the motion of the hot plates 46A, 46B (120°–250° C.) and due to the fact that the heat can be transferred at high efficiency to the semi-finished product in a compressed state, the water and gas contents in the mixture X1 can be removed gradually, so that the mixture X1 is eventually degassed and dehydrated completely. Its density thus increases sufficiently. If gas should remain in the mixture X1, it may develop holes in the surface when the gas is released.

By passing through the hot plates 46A, 46B, the mixture X1 is formed into a strip article Z. By further moving the endless belts 45A, 45B, the strip article Z is fed into between the cooling plates 51A, 51B, which has been cooled by passing a coolant, to cool the surface of the strip article Z. After cooling, the strip article Z is cut to a plurality of plate-shaped articles of a predetermined length. By reheating these plate articles, they can be formed into any desired three-dimensional shape. For example, it is possible to form secondary products having complicated shapes such as pallets from such plate articles on or off the line.

Since the hot plates 46A, 46B are placed horizontally one over the other, the entire apparatus is sufficiently short no matter how large the plates 46A, 46B are. Such an apparatus can be installed in a low-ceilinged factory building. The mixture X1 can be continuously pressed, heated and dried with high efficiency.

The mixture untangling vane 42 untangles the mixture X1 immediately before being dropped into the pre-pressing chamber R. This prevents the strip article Z1 from developing stripe banding. Strong plate articles can be formed from such a strip article Z1.

The mixture X1 is a mixture of waste materials. Its material cost is thus nearly zero. Wastes are more efficiently recyclable.

The present invention is not limited to the above embodiments. Various alterations and modifications can be made on these embodiments. For example, in the second and third embodiments, a decorative film Y1 or a refractory powder layer may be provided only on one side, instead of each side, of the mixture Xi. Also, in the second embodiment, the supply rolls 62A, 62B of the decorative film supply unit 43 may be rotated by a driving motor adapted to be activated simultaneously when the mixture X1 is introduced. In the third embodiment, the hoppers 101A, 101B of the powder supply unit 100 may have their outlets **101*b* located near the space S between the endless belts 45A, 45B and the refractory powder guide plates 104A, 104B to feed the refractory powder in the hopper 101A, 101B into the space S by rotating powder feed rolls in the hopper 101A, 101B** with a motor simultaneously when the mixture X1 is introduced.

According to the present invention a pair of horizontal hot plates provided vertically spaced from each other for vibrating the mixture will not require a high factory building in spite of large size and can press the material mixture sufficiently and dry it continuously.

According to the present invention the decorative layers are formed simultaneously when forming the plate-shaped substrate. It is possible to form plate articles automatically and efficiently at low cost, the articles having decorative layers of desired color, luster and color arrangement.

According to the present invention the refractory powder layers are formed simultaneously when forming the plate-shaped substrate. Thus, it is possible to form automatically and efficiently plate articles having refractory layers thereon.

Heretofore, it was difficult to provide strongly bonded refractory powder layers on the surface of the substrate. Thus, conventional fire-resistant plate articles had to be formed entirely from a fire-resistant material. Such plate articles were extremely heavy and expensive. In contrast, according to the present invention, it is possible to form a fire-resistant plate article comprising a non-fire-resistant substrate and fire-resistant surface layers. Such plate article weighs only about 1/5 of a conventional fire-resistant board. Its manufacturing cost can be reduced to about 1/3.

What is claimed is:

1. An apparatus for continuously forming plate-shaped articles, said apparatus comprising:

a pair of belt support plates having top ends and defining a material introduction chamber therebetween, said belt support plates being positioned such that said material introduction chamber has a width which increases in a direction toward said top ends of said belt support plates to facilitate introduction of a mixture of materials into said introduction chamber;

a pair of inlet rolls provided adjacent said top ends of said belt support plates, respectively;

a pair of endless belts;

a pair of horizontal hot plates vertically spaced from each other for pressing the mixture of materials therebetween to form a strip article;

a hot plate moving unit including a first hot plate moving means for reciprocating said hot plates in a horizontal direction parallel to a feed direction of the material between said hot plates, and a second hot plate moving means for moving the hot plates in a vertical direction toward and away from each other, wherein said first and second hot plate moving means are combined so that said hot plates are moved from an initial position in a vertical direction toward each other while moving said hot plates forward, and then said hot plates are moved in a vertical direction away from each other while moving said hot plates backward to the initial position;

a plurality of delivery rolls for moving said endless belts in a direction to feed said strip article; and a cooling unit including cooling plate for cooling an outer surface of the strip article, wherein said endless belts are wound around said inlet rolls and said delivery rolls so as to cover said belt support plates, said hot plates and said cooling plates.

2. The apparatus as claimed in claim 1, wherein said hot plates move horizontally at substantially the same speed as the speed of said endless belts while said hot plates are moved toward each other.

3. The apparatus as claimed in claim 1, further comprising a pair of decorative film supply units rotatably supported in the vicinity of said pair of inlet rolls, respectively, wherein decorative films from said film supply units are fed into said material introduction chamber by said endless belts.

4. The apparatus as claimed in claim 1, further comprising a shaft rotatably mounted in said material introduction chamber, and a plurality of blades mounted on said shaft.

5. The apparatus as claimed in claim 1, further comprising a pair of powder guide plates disposed in said material introduction chamber, wherein said pair of guide plates are positioned so as to be substantially parallel to said endless belts, respectively.

* * * * *